(12) United States Patent
Zientara et al.

(10) Patent No.: US 12,129,839 B2
(45) Date of Patent: Oct. 29, 2024

(54) PISTON COUPLER FOR A RECIPROCATING PUMP

(71) Applicant: Wagner Spray Tech Corporation, Plymouth, MN (US)

(72) Inventors: Daniel R. Zientara, Lakeville, MN (US); Joseph W. Kieffer, Chanhassen, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 200 days.

(21) Appl. No.: 17/578,684

(22) Filed: Jan. 19, 2022

(65) Prior Publication Data

US 2022/0252057 A1    Aug. 11, 2022

Related U.S. Application Data

(60) Provisional application No. 63/146,073, filed on Feb. 5, 2021.

(51) Int. Cl.
*F04B 15/02* (2006.01)
*B05C 5/02* (2006.01)
(Continued)

(52) U.S. Cl.
CPC ............ *F04B 15/02* (2013.01); *B05C 5/0237* (2013.01); *B05C 11/1031* (2013.01); *B05D 1/26* (2013.01); *F04B 53/16* (2013.01); *F04B 9/10* (2013.01)

(58) Field of Classification Search
CPC .. F04B 15/02; F04B 15/03; F04B 9/10; Y10T 403/5766; Y10T 403/5761; Y10T 403/5786
(Continued)

(56) References Cited

U.S. PATENT DOCUMENTS 4,030,857 A * 6/1977 Smith, Jr. ............... F04B 49/24
  417/46
4,358,140 A * 11/1982 Jonsson .............. F16L 37/1225
  285/80
(Continued)

FOREIGN PATENT DOCUMENTS

JP        10-306889 A     11/1998
WO    WO-2011063201 A1 *  5/2011 ............ F04B 53/147

OTHER PUBLICATIONS

International Preliminary Report for International Application No. PCT/US2022/013118 dated Aug. 17, 2023, 8 pages.
(Continued)

*Primary Examiner* — Kenneth Bomberg
*Assistant Examiner* — Daniel S Collins
(74) *Attorney, Agent, or Firm* — Christopher J. Volkmann; Kelly, Holt & Christenson, PLLC.

(57) ABSTRACT

A liquid delivery system includes a reciprocating drive and a liquid cylinder comprising a liquid piston, operably driven by the reciprocating drive, to pump a liquid along a flow path to a liquid applicator. The liquid delivery system includes a coupler configured to couple the liquid piston to the reciprocating drive. The coupler includes a plurality of collar elements and a biasing member configured to apply a biasing force on the plurality of collar elements to retain the collar elements in a position that forms a collar that couples the liquid piston to the reciprocating drive.

18 Claims, 11 Drawing Sheets

(51) Int. Cl.
  *B05C 11/10* (2006.01)
  *B05D 1/26* (2006.01)
  *F04B 53/16* (2006.01)
  *F04B 9/10* (2006.01)

(58) Field of Classification Search
  USPC .................................................. 285/235, 236
  See application file for complete search history.

(56) References Cited

U.S. PATENT DOCUMENTS

| | | | | |
|---|---|---|---|---|
| 4,710,052 | A | * | 12/1987 | Elger ........................ E04C 5/165 |
| | | | | 403/310 |
| 6,164,188 | A | | 12/2000 | Miser |
| 7,229,105 | B2 | * | 6/2007 | Broersma ................ F41B 11/50 |
| | | | | 124/49 |
| 2002/0159823 | A1 | | 10/2002 | Aday et al. |
| 2004/0177752 | A1 | | 9/2004 | Buchhauser et al. |
| 2005/0199119 | A1 | | 9/2005 | McCollough et al. |

OTHER PUBLICATIONS

International Search Report and Written Opinion for International Patent Application No. PCT/US2022/013118 dated Apr. 26, 2022, 11 pages.
"GH™M Series Big Rig Sprayers" retrieved from <<https://www.graco.com/content/dam/graco/tech_documents/manuals/332/332157/332157EN-A.pdf>>, accessed on Jan. 8, 2021, 36 pages.

\* cited by examiner

PISTON COUPLER FOR A RECIPROCATING PUMP

CROSS-REFERENCE TO RELATED APPLICATION

The present application is based on and claims the benefit of U.S. Provisional Patent Application Ser. No. 63/146,073, filed Feb. 5, 2021, the content of which is hereby incorporated by reference in its entirety.

BACKGROUND

Liquid delivery systems are used to deliver liquid from a source location to a delivery location. In some instances, liquid delivery systems include a pump system configured to provide the liquid at a desired operational pressure. Liquid delivery systems are useful for a variety of liquids, for example paints, primers, finishes, and other exemplary liquids.

SUMMARY

A liquid delivery system includes a reciprocating drive. The reciprocating drive is coupled to a reciprocating paint pump piston by a coupler. The coupler includes a collar assembly, an elastic member and a sheath.

The above summary is not intended to describe each illustrated embodiment or every implementation of the present disclosure.

DETAILED DESCRIPTION

For the sake of illustration, but not by limitation, aspects of the present disclosure relate to reciprocating liquid pumps. While examples below are illustrated in the context of paint, it is noted that the present features can also be applicable to pumps for use with other types of liquids as well. Further, while examples below are illustrated in the context of a hydraulic-powered reciprocating drive, it is noted that the present features can also be applicable to other types of reciprocating drives as well.

Many paint delivery systems that employ paint pumps are subject to significant wear and tear over their lifetime. It is desired to have a system that allows a user to easily remove the paint pump from its reciprocating drive, for example for cleaning, maintenance, and/or to replace parts.

Figure 1:
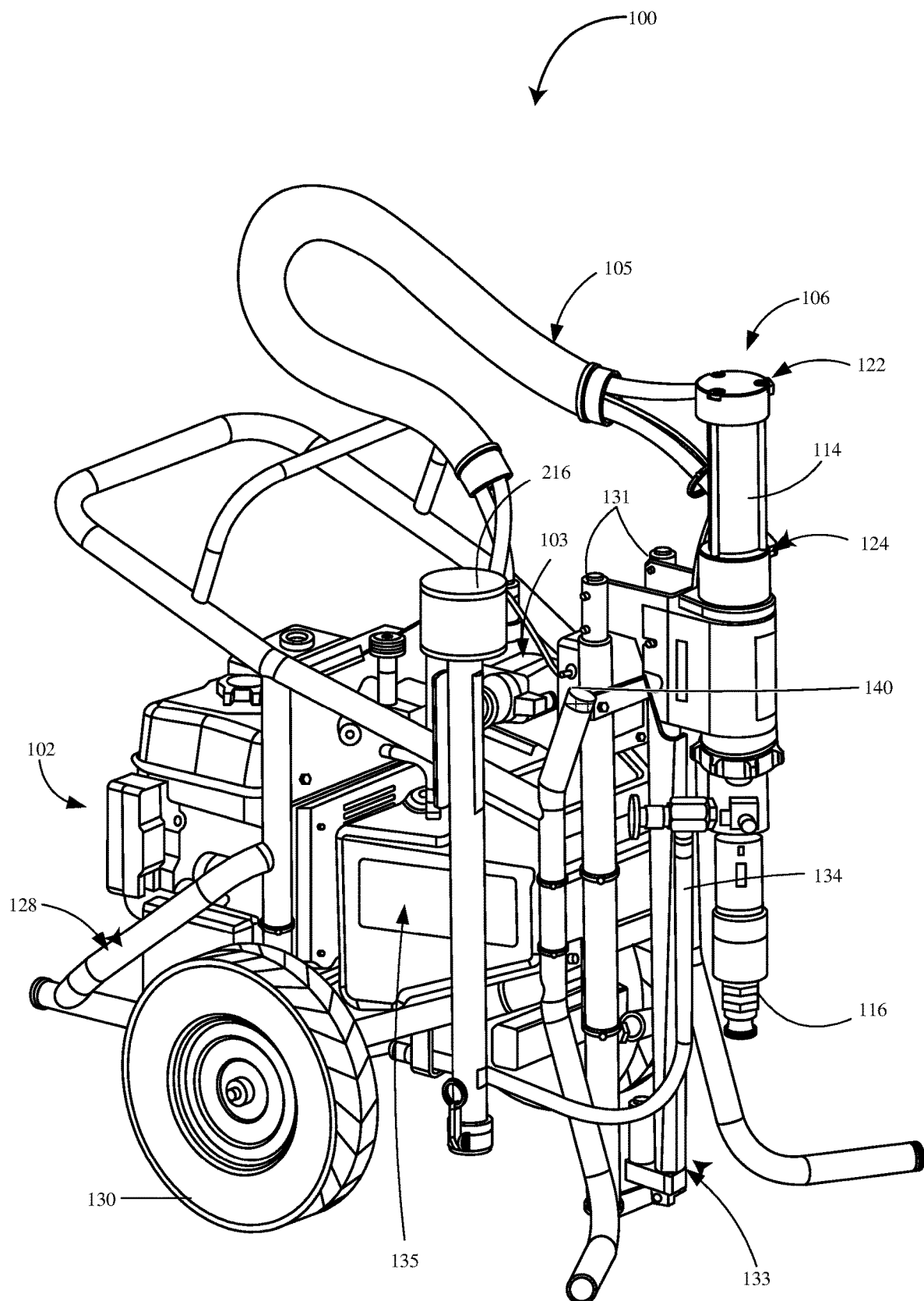
FIG. 1 is a perspective view showing an example painting system.

FIG. 1 is a perspective view showing an example paint delivery system 100. Paint delivery system 100 includes a frame 128, wheels 130, a motor system 102, a solenoid valve 103, a pump assembly 106, and a paint reservoir (not shown). Motor system 102 drives a hydraulic pump which pumps hydraulic fluid to/from a hydraulic fluid reservoir. Motor system 102 as shown is a gasoline powered engine. However, in other examples motor system 102 can be electrically powered, hydraulically powered, diesel powered, Power Take Off (PTO) powered, etc. The hydraulic pump and hydraulic fluid reservoir are located generally at reference number 135. The hydraulic pump delivers hydraulic fluid (e.g., oil) from the hydraulic fluid reservoir to solenoid valve 103. Solenoid valve 103 includes a solenoid, a valve body, a head port on the valve body, and a rod port on the valve body. The head port on the valve body and the rod port on the valve body can be controlled by an electric current through the solenoid. Solenoid valve 103 can alternate the flow from the head port on the valve body and the rod port on the valve body through conduits 105 to ports 122 and 124 on hydraulic cylinder 114, respectively.

As shown, solenoid valve 103 is coupled to a controller 140. Controller 140 can include a variety of different hardware and/or software components. In one example, the controller comprises a MOSFET and flip-flop integrated circuit system. In another example, the solenoid of solenoid valve 103 is controlled by a computer processor and integrated software, for example a circuit board. The circuit board can be communicably coupled, directly to the solenoid of solenoid valve 103. Controller 140 can also be coupled to a memory, such that the controller can report, or store, collected information from a cycle counter and/or a run-time tracker. Controller 140 can be useful to measure performance of the pump system without manual cycle counting. As shown controller 140 is proximate solenoid valve 103, however, controller 140 may be located elsewhere.

Pump assembly 106 includes a hydraulic cylinder 114 and a paint pump 116. Solenoid valve 103 directs the hydraulic fluid, generated by the hydraulic pump, through the head port on the valve body through a conduit 105 to a head port 122 of hydraulic cylinder 114. As the hydraulic fluid is directed by the solenoid valve through head port 122 of hydraulic cylinder 114, pressure builds in the cylinder and forces the hydraulic piston to move towards rod port 124. As the hydraulic piston moves through cylinder, the hydraulic fluid is forced through rod port 124 of hydraulic cylinder 114, through a conduit 105 into solenoid valve 103 through the rod port on the valve body and returned to the hydraulic fluid reservoir.

In one example, as the hydraulic piston moves from the head port 122 through the cylinder 114 to rod port 124, a ferrous metal located on the hydraulic piston rod moves closer to a first hall effect sensor (not shown in FIG. 1) at a stroke limit position. When the hydraulic piston has reached the stroke limit position in the cylinder, the ferrous metal is be detected by the first hall effect sensor. In response to detecting the ferrous metal, the hall effect sensor sends a sensor signal to the controller 140. In response, controller 140 controls the solenoid in solenoid valve 103 to change states.

Once the solenoid state changes, the hydraulic fluid flowing from the hydraulic pump can flow through solenoid valve 103, through conduit 104 into rod port 124 of hydraulic cylinder 114. Moreover, the hydraulic fluid can be pushed back through head port 122 of hydraulic cylinder 114, through conduit 105, into solenoid valve 103, and returned to the hydraulic fluid reservoir. When the hydraulic piston has reached a second stroke limit position, the ferrous metal located on the hydraulic piston rod, causes a second hall effect sensor (not shown in FIG. 1) to detect the position of the rod. Controller 140 receives a signal from the second hall effect and then controls the solenoid to change states such that hydraulic fluid flow again reverses. This cycle is repeated such that the hydraulic piston moves in a reciprocating manner. In other examples, the hydraulic piston can be reciprocated in other ways as well.

As the hydraulic piston rod reciprocates, a paint piston rod (not shown in FIG. 1), operably coupled to the hydraulic piston rod, also reciprocates. As a result, the paint piston rod pumps paint through paint pump 116 from the paint reservoir to an outlet hose 134 connected to a paint applicator (not shown in FIG. 1).

Pump assembly 106 is coupled to linear guides 131 that allow vertical movement of pump assembly 106. Actuator 133 retains pump assembly 106 in place and/or actuates pump assembly 106 to raise and lower. As shown, actuator 133 includes an electric motor and screw drive. In other examples, actuator 133 can include other items as well. As shown, pump assembly 106 can be raised such that paint intake 216 can be coupled to the bottom of paint pump 116. Once paint intake 216 is coupled to paint pump 116, pump assembly 106 can be lowered such that the weight of pump assembly 106 and/or paint pump 116 is supported by the ground, bottom of a fluid reservoir, or other surface.

Figure 2A:
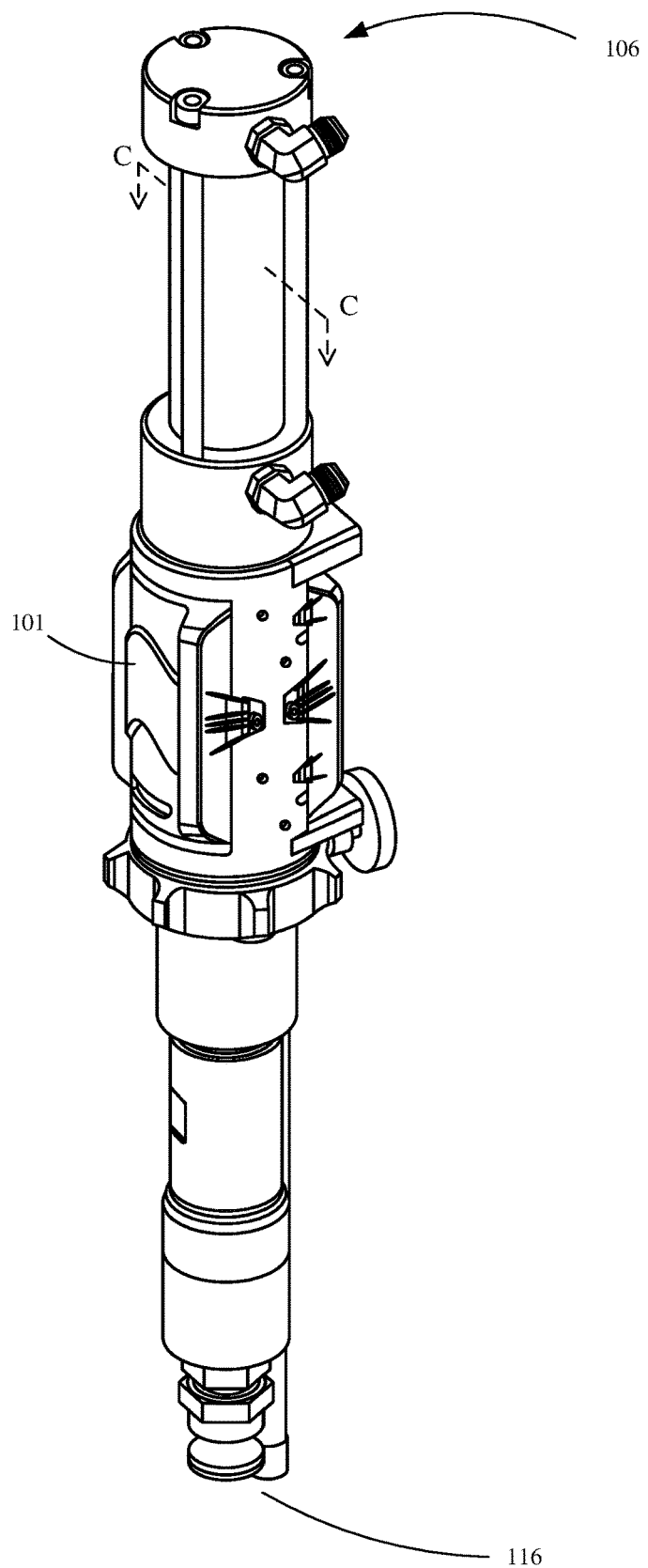
FIG. 2A is a perspective view showing an example pump assembly.

FIGS. 2A-2D show views of pump assembly 106, in one example. FIG. 2A is a front perspective view of a portion of pump assembly 106. In this view, cover 101 is coupled to one or more components of pump assembly 106. Cover 101 can protect internal components from external conditions. Cover 101 can also prevent items from getting caught in the reciprocating motion of the paint pump. In some examples, cover 101 is at least semi-transparent.

Figure 2B:
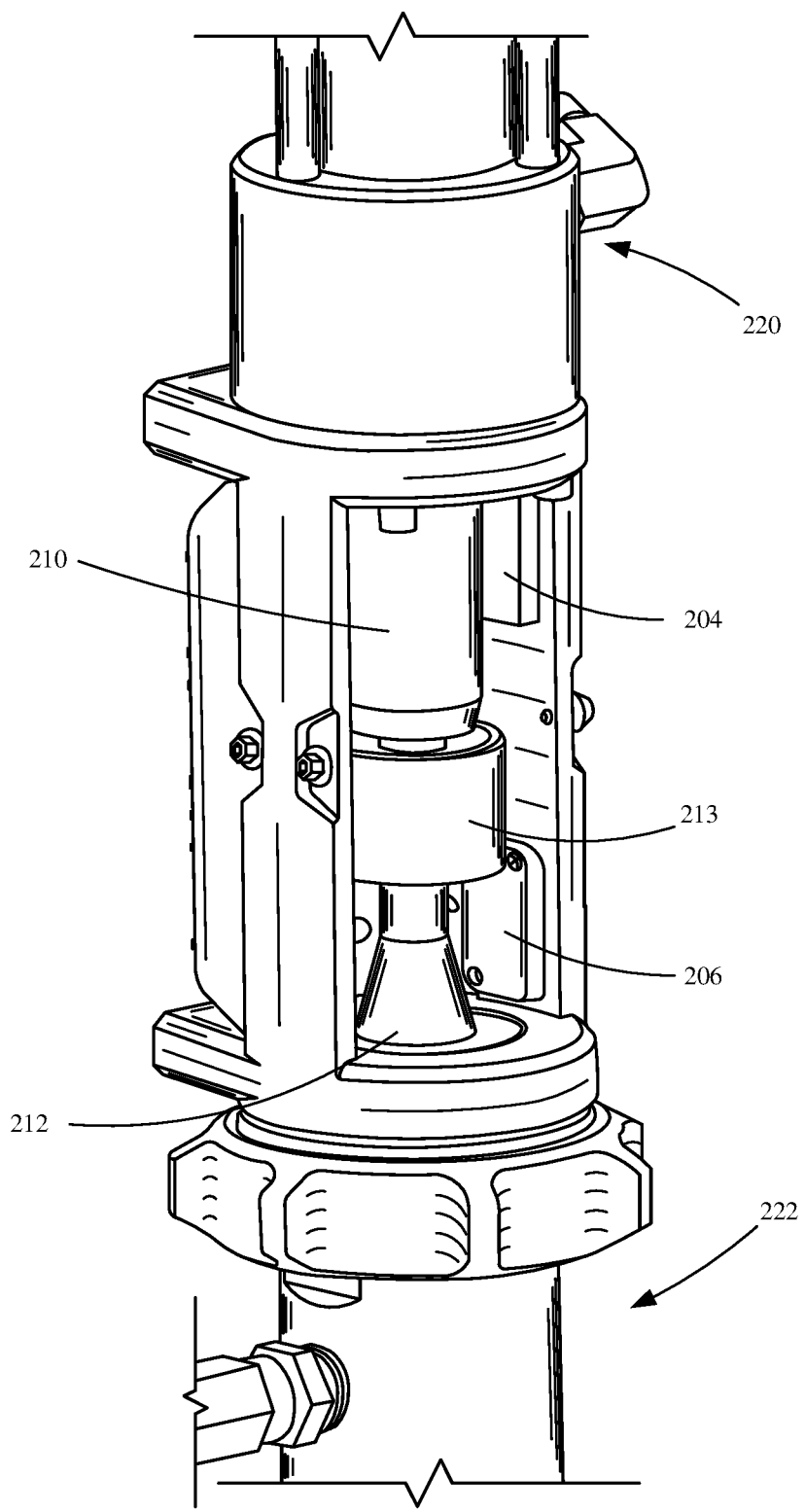
FIG. 2B is a detailed view showing an example coupling between a paint pump and hydraulic drive.

FIG. 2B is a perspective view of a portion of pump assembly 106, with cover 101 removed to expose sensor 204, sensor 206, coupler 213, hydraulic rod 210 and paint rod 212. Sensor 204 and sensor 206 sense the location of coupler 213. In some examples, sensors 204 and sensor 206 correspond to minimum and maximum positions of coupler 213. Coupler 213 couples hydraulic rod 210 to paint rod 212, and hence, the location of coupler 213 is indicative of the positions of hydraulic rod 210 and paint rod 212. Therefore, when sensor 204 or sensor 206 detects coupler 213, the sensor output is also indicative of the location of hydraulic rod 210 and paint rod 212 (e.g., these rods reaching a minimum or maximum stroke limit).

As shown, in the present example, minimum sensor 204 and maximum sensor 206 are hall effect sensors that can detect the change in an electromagnetic field. In other examples, minimum sensor 204 and maximum sensor 206 could include different types of sensors. As shown, both minimum sensor 204 and maximum sensor 206 include a magnet that generates a magnetic field. When coupler 213 comes within a threshold distance from the magnet, the magnetic field changes in a detectable way. This change is indicative of coupler 213 being at either location proximate the minimum sensor 204 or maximum sensor 206. The locations of minimum sensor 204 and maximum sensor 206 can be relative to coupler 213, in such a way, that when coupler 213 reaches either sensor, the hydraulic rod 210 and/or paint rod 212 is either at their maximum or minimum stroke position.

Illustratively shown in these figures the source of reciprocating motion is hydraulic rod 210 which is part of a hydraulic drive system. In other examples, hydraulic rod 210 can be replaced by a different reciprocating mechanism that is driven in a different way.

Figure 2C:
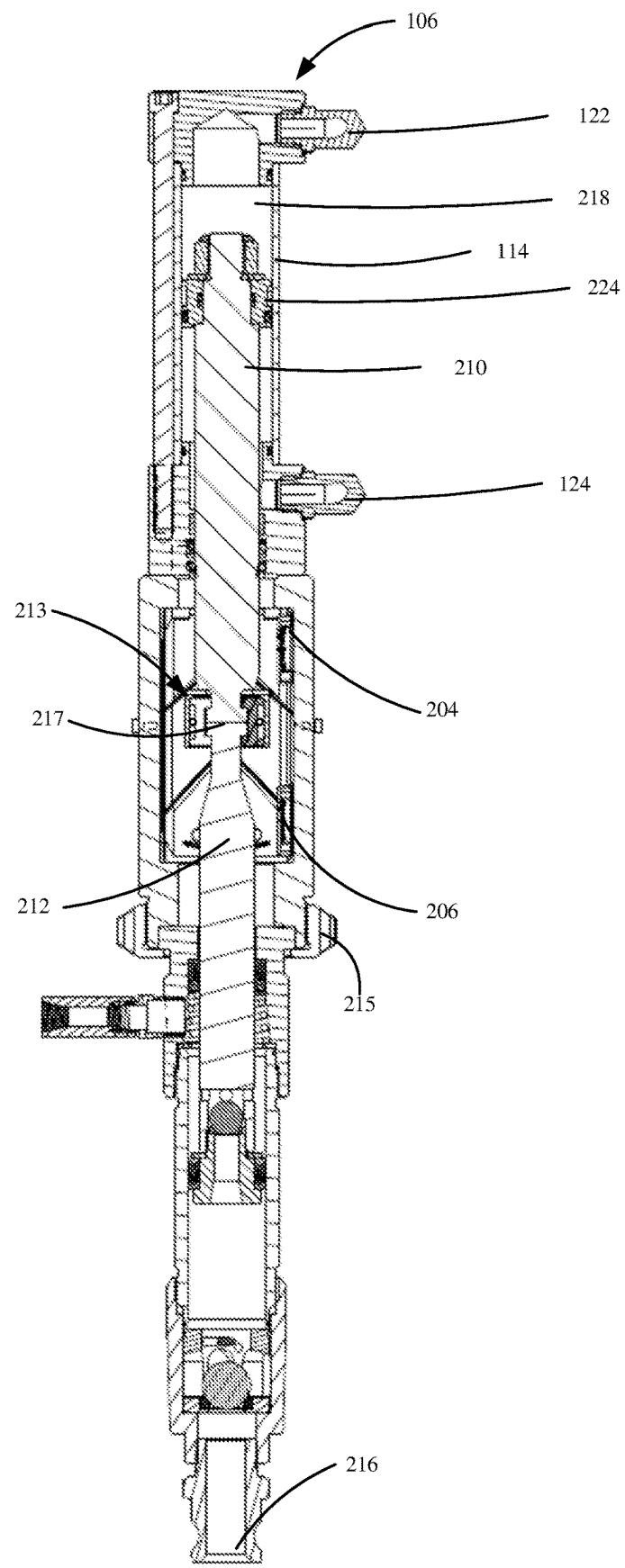
FIG. 2C is a sectional view showing an example coupling between a paint pump and hydraulic drive.

FIG. 2C is a sectional view of pump assembly 106 taken along plane corresponding to C-C shown in FIG. 2A. As can be seen in FIG. 2C, pump assembly 106 includes head port 122 of hydraulic cylinder 114, rod port 124 of hydraulic cylinder 114, a paint rod 212, a hydraulic rod 210, a hydraulic piston 224, a paint intake 216, a hydraulic cylinder cavity 218, a minimum sensor 204, maximum sensor 206, and coupler 213.

An actuator (e.g., solenoid valve 103) directs a hydraulic fluid into hydraulic cylinder cavity 218 through head port 122 of hydraulic cylinder 114. The hydraulic fluid forces hydraulic piston 224 to move down through hydraulic cylinder cavity 218. As hydraulic piston 224 moves down through hydraulic cylinder cavity 218, paint rod 212 moves down through paint pump cavity and pushes paint out a hose outlet (e.g., through a hose to paint applicator). In addition, hydraulic fluid is forced back through rod port 124 of hydraulic cylinder 114, into the solenoid valve and returned to a hydraulic fluid reservoir.

In one example, when hydraulic piston 224 is at a stroke limit position, coupler 213 is proximate maximum sensor 206, and maximum sensor 206 generates a sensor signal indicative of coupler 213 reaching the maximum position. In response to receiving the sensor signal, controller 140 reverses the state of the solenoid valve and causes the hydraulic fluid to flow into hydraulic cylinder cavity 218 through rod port 124 of hydraulic cylinder 114, thereby reversing the direction of piston 224. As piston 224 travels up, the hydraulic fluid is forced out of head port 122 of hydraulic cylinder 114, into the solenoid valve and returned to the hydraulic fluid reservoir. Paint rod 212 also moves up through the paint pump cavity and draws the paint in through paint intake 216. When the hydraulic piston has reached its upper stroke limit position, coupler 213 is sensed by minimum sensor 204 is reversed the hydraulic fluid flow into hydraulic cylinder cavity 218 through head port 122 of hydraulic cylinder 114.

Figure 2D:
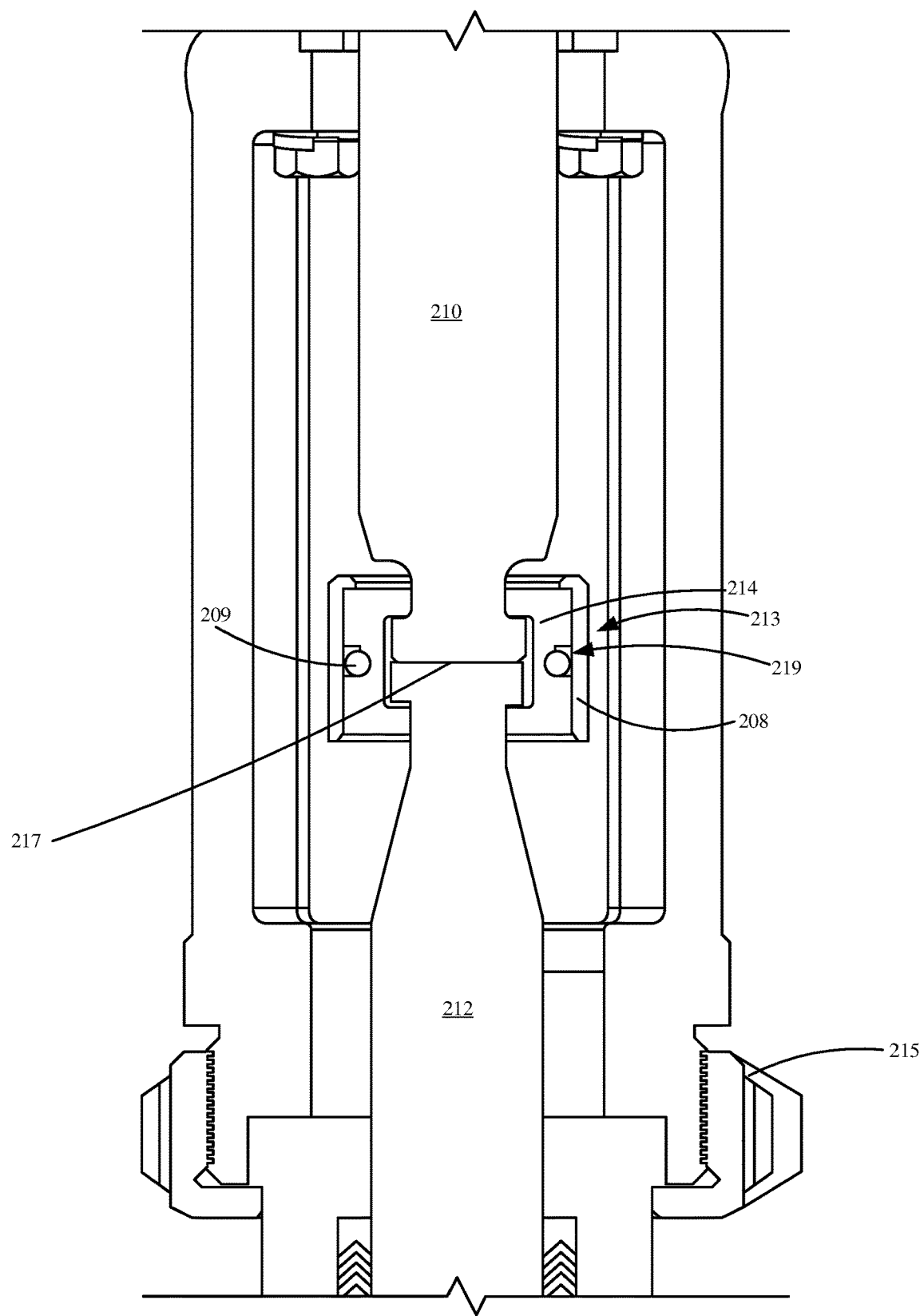
FIG. 2D is a sectional view showing an example coupling between a paint pump and hydraulic drive.

FIG. 2D is a sectional view showing an area of pump assembly 106 proximate coupler 213, in greater detail. Coupler 213 includes a collar 214, a sheath 208, and an elastic member 209. While examples below are illustrated in the context of elastic member 209 including an O-ring, it is noted that other types of elastic members can be utilized as well.

Collar 214 couples hydraulic rod 210 to paint rod 212. Collar 214 includes collar elements 215-1, 215-2 (collectively referred to as collar elements 215), that fit over, and form a collar around, hydraulic rod 210 and paint rod 212 proximate interface 217. In some examples, there may be more or fewer collar elements 215. To keep collar elements 215 of collar 214 in contact with hydraulic rod 210 and paint rod 212, O-ring 209 and/or sheath 208 are fit over the exterior surface of collar 214 to inhibit lateral movement of elements 215 of collar 214 relative to the stroke direction of hydraulic rod 210 and paint rod 212.

Accordingly, O-ring 209 couples collar elements 215 together. O-ring 209 can also be sized such that it is compressed by sheath 208. In some examples, the compression of O-ring 209 by sheath 208 applies a retaining force on sheath 208 such that sheath 208 is retained on collar elements 215 during cycling of piston 224. As shown, O-ring 209 fits within channel 219. Channel 219 keeps O-ring 209 in place around collar elements 215.

Figure 3:
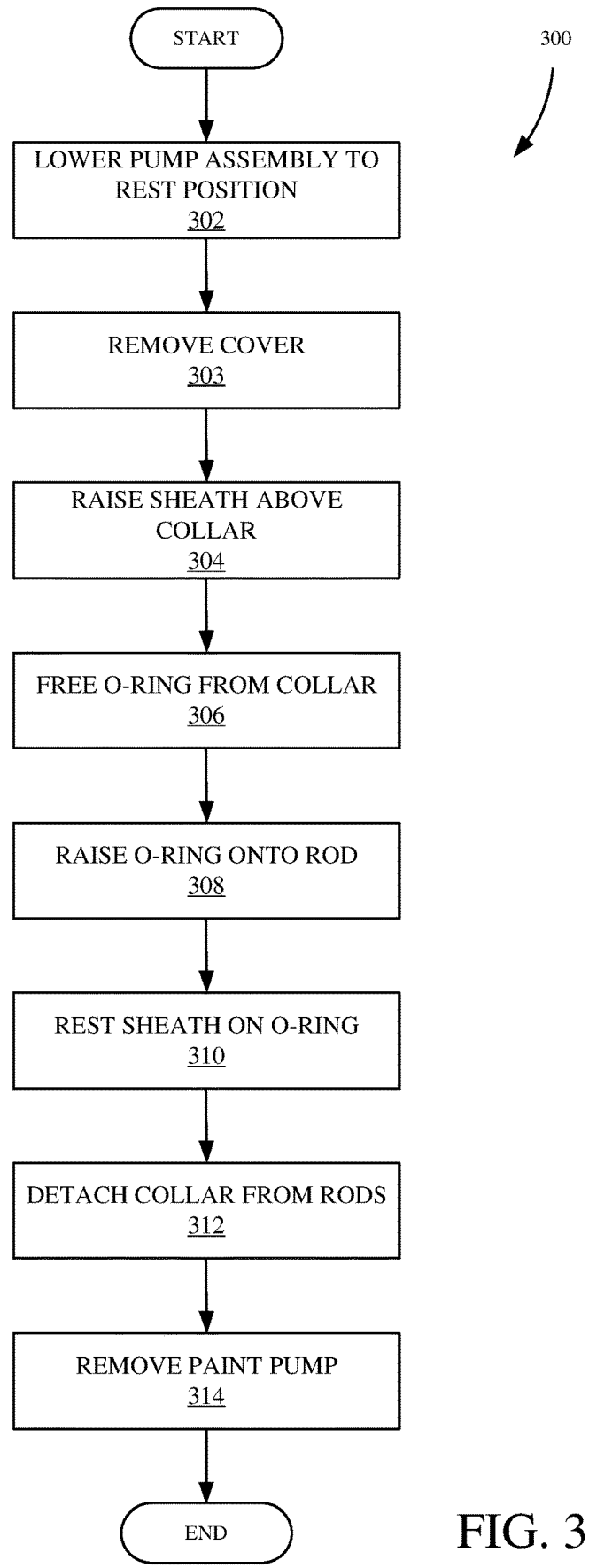
FIG. 3 is a flow diagram showing an example operation of removing a paint pump.

FIG. 3 is a flow diagram showing an example operation 300 of removing a paint pump from a reciprocating drive. For sake of illustration, but not by limitation, FIG. 3 will be described in conjunction with FIGS. 4A-4D and in the context of assembly 106 shown above in FIGS. 2A-2D. Operation 300 begins at block 302 where the pump assembly is optionally lowered until the paint intake 216 is resting on the ground or other surface such that paint pump 116 or other components are supported by the ground or other surface.

Figure 4A:
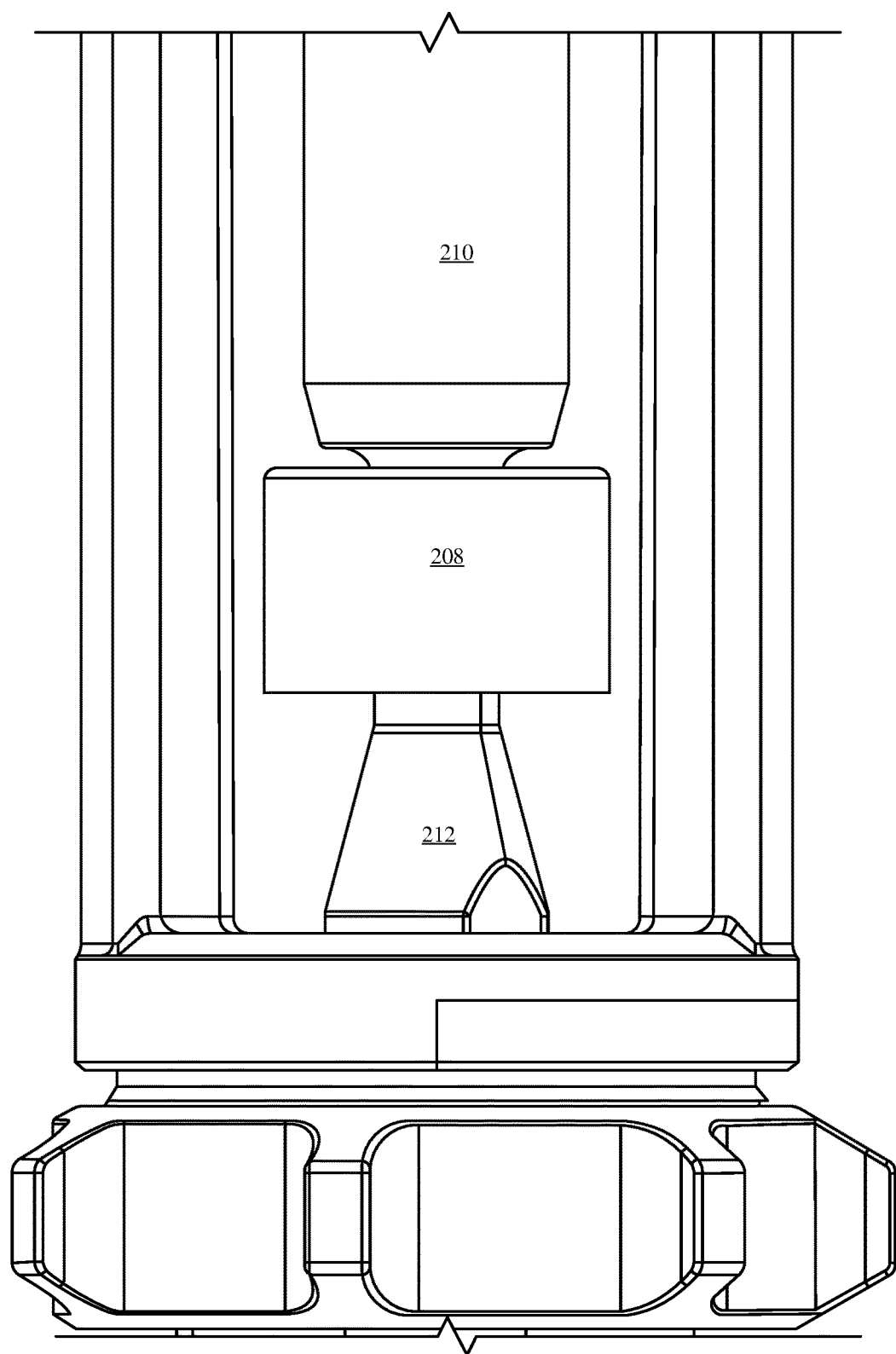
FIGS. 4A-D are side views showing an example pump assembly during a paint pump removal operation.

Operation 300 proceeds at block 303 where cover 101 is removed from pump assembly 106. FIG. 4A shows an example where cover 101 is removed. In some examples, there may not be a cover 101, in those examples, this step is not required.

Figure 4B:
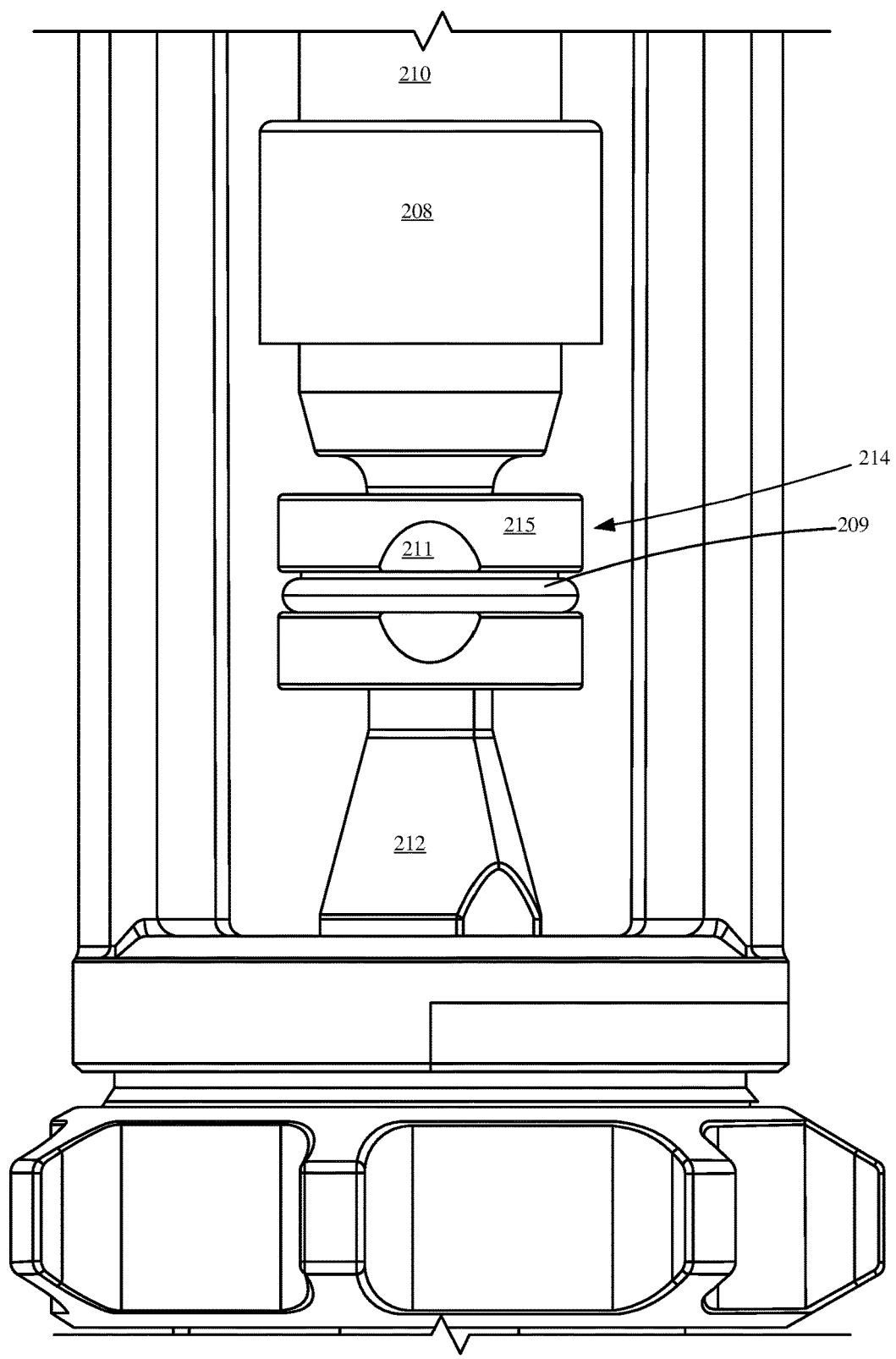

Operation 300 proceeds at block 304 where sheath 208 is raised above collar 214. FIG. 4B shows one example of this.

Operation 300 proceeds at block 306 where O-ring 209 is freed from collar 214. As shown in at least FIG. 4B, a beveled area 211 can be provided to ease in freeing of O-ring 209. Beveled area 211 is a type of finger groove that allows a user's finger or other tool access lower portions on O-ring 209 such that it can be lifted out of channel 219.

Figure 4C:
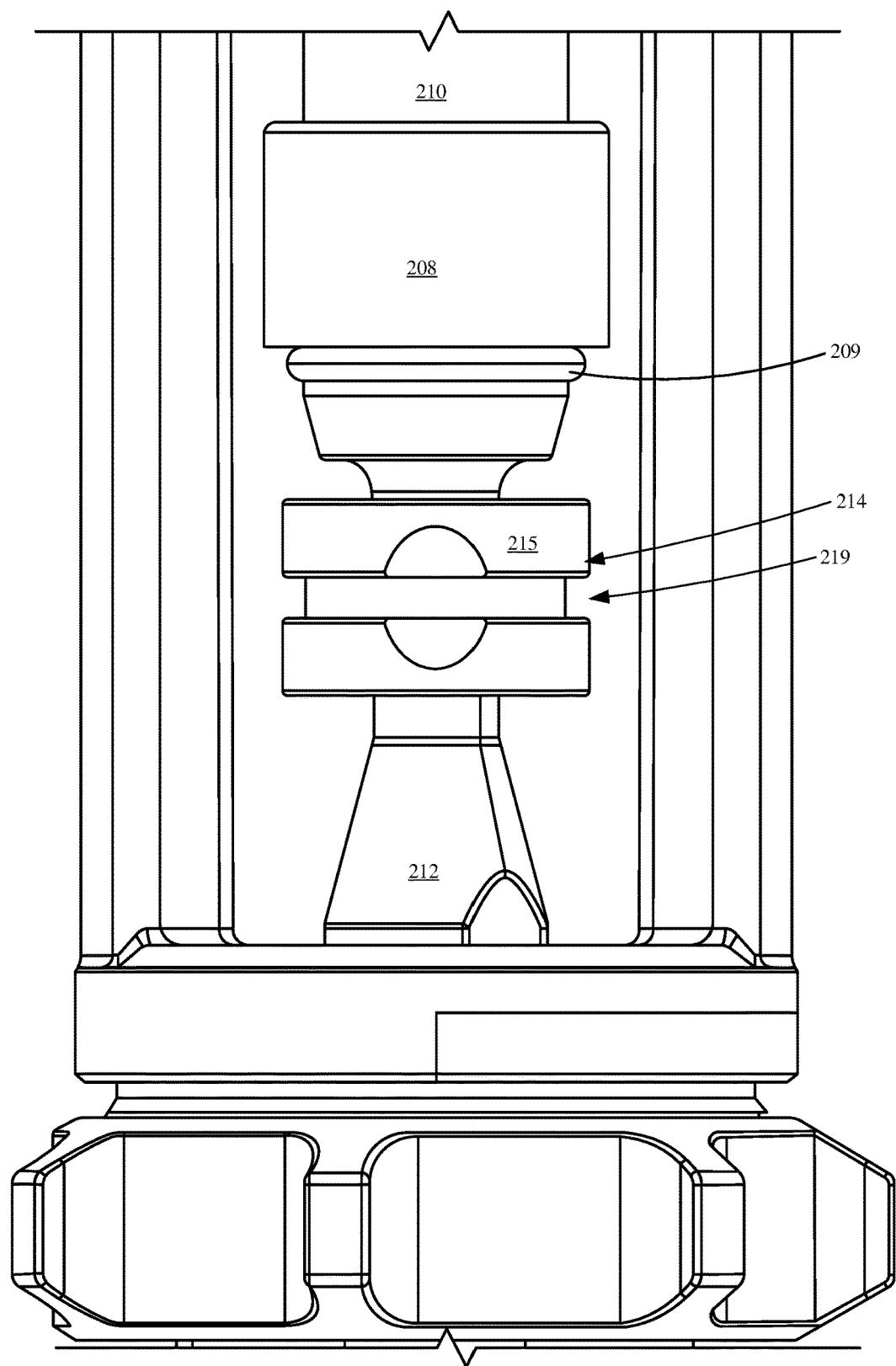

Operation 300 proceeds at block 308 where O-ring 209 is raised and placed on rod 210, as shown in FIG. 4C. To facilitate positioning of O-ring 209 on rod 210, in one example, O-ring 209, at rest, has an inner diameter that is less than or equal to the outside diameter of rod 210, such that O-ring 209 is deformed to fit on rod 210 and an elastic force/friction force of O-ring 209 retains O-ring 209 on rod 210. The size and properties of O-ring 209 can be chosen such that when O-ring 209 deformed to fit on rod 210 it does not exceed a yield point. In some examples, O-ring 209 at rest has an inner diameter that is 90-98% of the outside diameter (or convex hull) of the rod 210. In some examples, a feature can be included on rod 210 to help in retaining O-ring 209. In some examples, O-ring 209 is placed on a different portion of assembly 106 other than rod 210.

Operation 300 proceeds at block 310 where sheath 208 is rested on O-ring 209. FIG. 4C shows an example where sheath 208 is rested on O-ring 209. This allows a user to free their hand that would normally be used to hold sheath 208 above collar elements 215. A common problem in current systems is that sheath 208 is unsupported and when the lower assembly is removed the sheath 208 can fall into the liquid source. Another common problem is that a user tries to hold sheath 208 and both collar elements 215 at the same time and one of the objects fall into the liquid source. Having a device that supports sheath 208 helps prevent these problems. O-ring 209, in some examples, has a size and physical properties (e.g., elasticity, asperity, etc.) that allow it to support sheath 208.

Figure 4D:
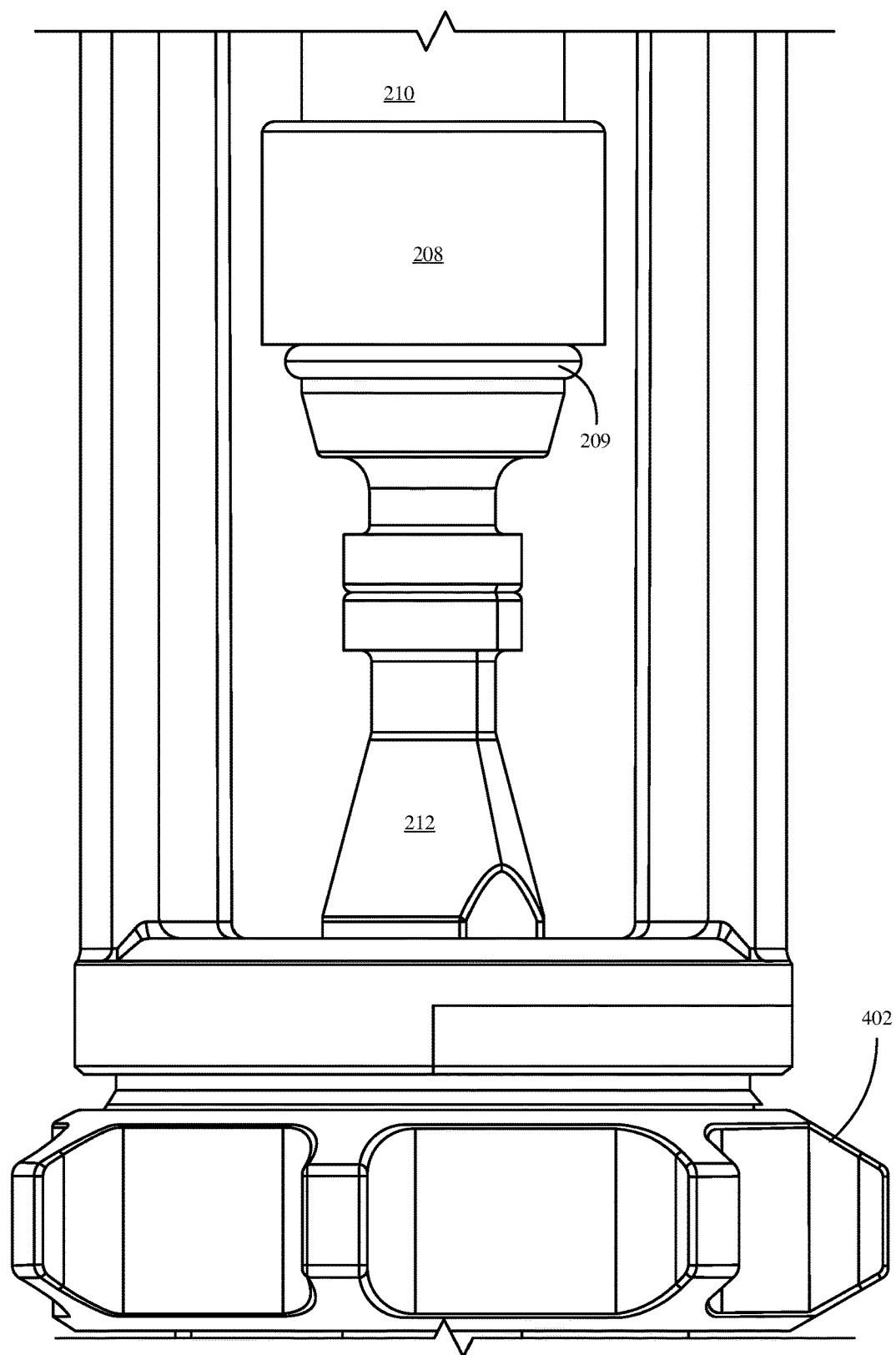

Operation 300 proceeds at block 312 where collar elements 215 are detached from rods 210 and 212. FIG. 4D shows an example where collar elements 215 are detached from rods 210 and 212.

Operation 300 proceeds at block 314 where paint pump 116 is removed from the assembly. Nut 402 can be loosened which releases paint pump 116 from the other components of pump assembly 106. As noted in block 302, the paint pump 116 may be supported by paint intake 216, and thus a user can tip paint pump 116 away from the assembly without supporting the full weight of paint pump 116.

Figure 5:
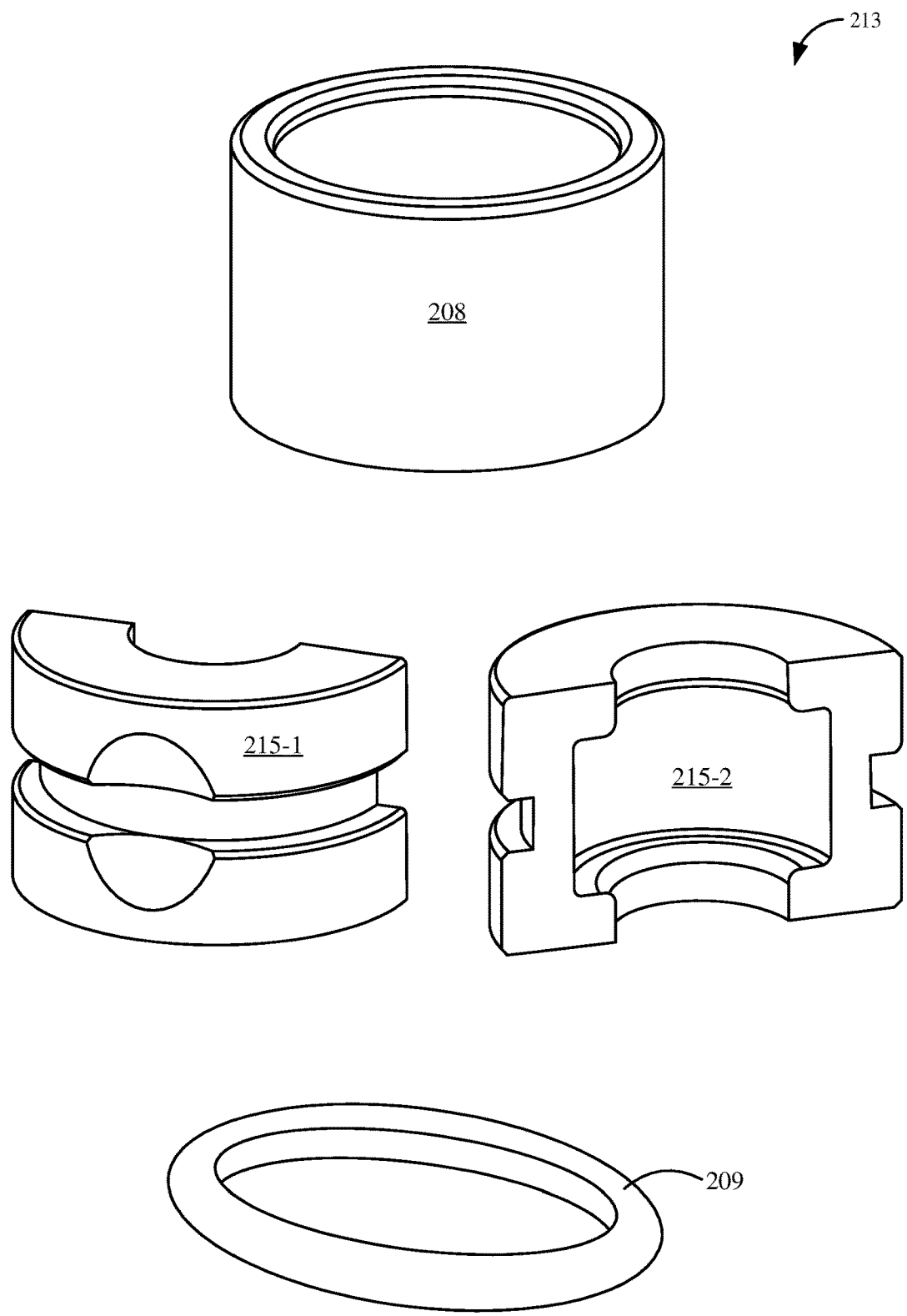
FIG. 5 is a perspective view showing example components of a pump coupler assembly.

FIG. 5 is a perspective view of an example pump coupler assembly. As shown, assembly 500 includes sheath 208, collar elements 215, and O-ring 209. As shown elements 215-1 and 215-2 are substantially identical parts. In other examples, each element 215-1, 215-2 may be different from one another. In some examples, collar elements 215-1, 215-2 include machined portions. In some examples, collar elements 215-1, 215-2 include cast portions. As shown, collar elements 215 include an exterior retaining channel that is configured to receive O-ring 209. The exterior retaining channel can have a beveled portion (shown on element 215-1) that allows for easy removal of O-ring 209. In some examples, O-ring 209 is a geometric torus having a minor diameter that is greater than the depth of the exterior retaining channel of collar 214, such that sheath 208 compresses O-ring 209.

Collar elements 215 also include an interior channel (shown on element 215-2) that receives portions of the reciprocating drive and paint pump to couple the reciprocating drive to the paint pump.

According to one example, a paint delivery system includes a reciprocating paint pump that is coupled to a reciprocating hydraulic piston by a coupler. The coupler includes two or more collar elements that are disposed over the interface between the reciprocating paint pump and the hydraulic piston. An interior channel of the two or more collar elements couple the reciprocating paint pump and the hydraulic piston, such that reciprocating motion of the hydraulic piston is transferred to the reciprocating paint pump. The two or more collar elements are held in place over the interface between the reciprocating paint pump and the hydraulic piston by an O-ring or other elastic device. The collar elements have an exterior retaining channel where the O-ring seats. The exterior retaining channel includes a beveled area that aides in removal of the O-ring by a user. A sheath can also be disposed over the collar elements and O-ring. When the sheath is placed over the O-ring, it compresses the O-ring. This compression also provides a friction force that keeps the sheath on the collar elements during pump operation.

The descriptions of the various examples of the present disclosure have been presented for purposes of illustration but are not intended to be exhaustive or limited to the examples disclosed. Many modifications and variations will be apparent to those of ordinary skill in the art without departing from the scope and spirit of the described examples. The terminology used herein was chosen to explain the principles of the examples, the practical application or technical improvement over technologies found in the marketplace, or to enable others of ordinary skill in the art to understand the examples disclosed herein.

What is claimed is:

1. A liquid delivery system comprising:
   a reciprocating drive;
   a liquid cylinder comprising a liquid piston, operably driven by the reciprocating drive, to pump a liquid along a flow path to a liquid applicator; and
   a coupler configured to couple the liquid piston to the reciprocating drive, the coupler comprising:
      a plurality of collar elements; and
      a biasing member configured to apply a biasing force on the plurality of collar elements to retain the plurality of collar elements in a position that forms a collar that couples the liquid piston to the reciprocating drive, wherein the biasing member comprises an elastic member; and
      a sheath configured to overlay the plurality of collar elements and the biasing member, wherein at least one collar element, of the plurality of collar elements, comprises a channel configured to receive the elastic member, and wherein the sheath is movable from a first position in which the sheath overlays the plurality of collar elements and the biasing member to a second position in which the sheath is spaced apart from the plurality of collar elements while the biasing member remains disposed in the channel.

2. The liquid delivery system of claim 1, wherein the at least one collar element comprises a finger groove.

3. The liquid delivery system of claim 1, wherein a thickness of the elastic member is larger than a depth of the channel, such that when the elastic member is disposed in the channel, a portion of the elastic member protrudes out of the channel.

4. The liquid delivery system of claim 1, wherein the biasing member comprises an O-ring.

5. The liquid delivery system of claim 1, wherein the sheath has a lip such that the lip discourages the sheath from falling below the collar.

6. The liquid delivery system of claim 1, wherein the plurality of collar elements comprises a first collar element and a second collar element identical to the first collar element.

7. The liquid delivery system of claim 1 wherein the reciprocating drive comprises:
a source of hydraulic fluid;
a hydraulic cylinder fluidically coupled to the source of hydraulic fluid and having a hydraulic piston that reciprocates in the hydraulic cylinder;
a rod connected to the hydraulic piston and extending out of the hydraulic cylinder; and
wherein the collar couples the liquid piston to the rod.

8. A liquid delivery system coupler comprising:
a plurality of collar elements;
a biasing member configured to apply a biasing force on the plurality of collar elements to retain the plurality of collar elements in a position that forms a collar that couples a liquid piston, disposed in a liquid cylinder of a liquid delivery system, to a reciprocating drive configured to pump a liquid along a flow path to a liquid applicator, wherein the biasing member comprises an O-ring; and
a sheath configured to overlay the plurality of collar elements and the biasing member.

9. The liquid delivery system coupler of claim 8, wherein the biasing member comprises an elastic member, and at least one collar elements, of the plurality of collar elements, comprises a channel configured to receive the elastic member.

10. The liquid delivery system coupler of claim 9, wherein the channel comprises a finger groove.

11. A liquid delivery system coupler comprising:
a plurality of collar elements;
a biasing member configured to apply a biasing force on the plurality of collar elements to retain the plurality of collar elements in a position that forms a collar that couples a liquid piston, disposed in a liquid cylinder of a liquid delivery system, to a reciprocating drive configured to pump a liquid along a flow path to a liquid applicator; and
a sheath configured to overlay the plurality of collar elements and the biasing member wherein the biasing member comprises an elastic member, and at least one collar elements, of the plurality of collar elements, comprises a channel configured to receive the elastic member, and wherein a thickness of the elastic member is larger than a depth of the channel, such that when the elastic member is disposed in the channel, a portion of the elastic member protrudes out of the channel.

12. The liquid delivery system coupler of claim 8, wherein the sheath has a lip such that the lip discourages the sheath from falling below the collar.

13. The liquid delivery system coupler of claim 8, wherein the plurality of collar elements comprises a first collar element and a second collar element identical to the first collar element.

14. The liquid delivery system coupler of claim 8 wherein the reciprocating drive comprises:
a source of hydraulic fluid;
a hydraulic cylinder fluidically coupled to the source of hydraulic fluid and having a hydraulic piston that reciprocates in the hydraulic cylinder;
a rod connected to the hydraulic piston and extending out of the hydraulic cylinder; and
wherein the collar couples the liquid piston to the rod.

15. A liquid delivery system comprising:
a reciprocating drive comprising:
a source of hydraulic fluid;
a hydraulic cylinder fluidically coupled to the source of hydraulic fluid and having a hydraulic piston that reciprocates in the hydraulic cylinder; and
a rod connected to the hydraulic piston and extending out of the hydraulic cylinder;
a liquid cylinder comprising a liquid piston, operably driven by the reciprocating drive, to pump a liquid along a flow path to a liquid applicator; and
a coupler configured to couple the liquid piston to the reciprocating drive, the coupler comprising:
a plurality of collar elements;
a biasing member configured to apply a biasing force on the plurality of collar elements to retain the plurality of collar elements in a position that forms a collar that couples the liquid piston to the reciprocating drive; and
a sheath configured to overlay the plurality of collar elements and the biasing member,
wherein the collar couples the liquid piston to the rod, and
wherein the biasing member has an inner diameter that is less than or equal to an outside diameter of the rod of the reciprocating drive.

16. The liquid delivery system of claim 15, wherein the biasing member comprises an O-ring, and the inner diameter of the O-ring, at rest, is between 90 percent to 98 percent of the outside diameter of the rod.

17. The liquid delivery system of claim 15, wherein the biasing member is configured to engage and be retained on the rod due to a friction force.

18. A liquid delivery system comprising:
a reciprocating drive;
a liquid cylinder comprising a liquid piston, operably driven by the reciprocating drive, to pump a liquid along a flow path to a liquid applicator; and
a coupler configured to couple the liquid piston to the reciprocating drive, the coupler comprising:
a plurality of collar elements; and
a biasing member configured to apply a biasing force on the plurality of collar elements to retain the plurality of collar elements in a position that forms a collar that couples the liquid piston to the reciprocating drive; and
a sheath configured to overlay the plurality of collar elements and the biasing member, wherein the sheath is movable from a first position in which the sheath overlays the plurality of collar elements and the biasing member to a second position in which the sheath is spaced apart from the collar elements while the biasing member remains in a position that applies the biasing force on the plurality of collar elements to retain the plurality of collar elements in the position that forms the collar.

* * * * *